(12) United States Patent
Kogen et al.

(10) Patent No.: US 6,687,714 B1
(45) Date of Patent: Feb. 3, 2004

(54) METHOD AND SYSTEM FOR MANAGING TRANSACTION CARD DATA

(75) Inventors: Mark Kogen, Lawndale, CA (US); Warren Tan, Thousand Oaks, CA (US)

(73) Assignee: Citicorp Development Center, Inc., Los Angeles, CA (US)

( * ) Notice: Subject to any disclaimer, the term of this patent is extended or adjusted under 35 U.S.C. 154(b) by 0 days.

(21) Appl. No.: 09/515,313

(22) Filed: Feb. 29, 2000

Related U.S. Application Data (60) Provisional application No. 60/122,272, filed on Mar. 1, 1999.

(51) Int. Cl.⁷ .......................... G06F 17/30; G06F 12/00
(52) U.S. Cl. .......................................... 707/200; 707/10
(58) Field of Search .......................... 707/10, 203, 204; 705/16, 26, 43

(56) References Cited

U.S. PATENT DOCUMENTS

| | | | |
|---|---|---|---|
| 5,057,677 A | | 10/1991 | Bertagna et al. ............ 235/381 |
| 5,175,416 A | * | 12/1992 | Mansvelt et al. ........... 235/379 |
| 5,276,312 A | | 1/1994 | McCarthy .................... 235/380 |
| 5,317,636 A | * | 5/1994 | Vizcaino ....................... 705/65 |
| 5,434,994 A | * | 7/1995 | Shaheen et al. ............. 707/203 |
| 5,440,735 A | | 8/1995 | Goldring ......................... 707/8 |
| 5,530,232 A | * | 6/1996 | Taylor ......................... 235/375 |
| 5,532,689 A | * | 7/1996 | Bueno ......................... 235/384 |
| 5,559,313 A | * | 9/1996 | Claus et al. ................. 235/380 |
| 5,710,922 A | * | 1/1998 | Alley et al. ................. 707/201 |
| 5,731,576 A | * | 3/1998 | Valadier ..................... 235/379 |
| 5,757,918 A | * | 5/1998 | Hopkins ..................... 235/379 |
| 5,796,832 A | * | 8/1998 | Kawan ......................... 380/270 |
| 5,801,367 A | | 9/1998 | Asplund et al. ............ 235/384 |
| 5,901,303 A | * | 5/1999 | Chew ......................... 235/492 |
| 5,926,816 A | * | 7/1999 | Bauer et al. ................ 707/201 |
| 5,956,713 A | * | 9/1999 | Bamford et al. ............ 707/201 |

(List continued on next page.)

FOREIGN PATENT DOCUMENTS

EP     0 660 280 A1     6/1995     .......... G07F/17/42

OTHER PUBLICATIONS

PCT Application No. PCT/AU98/00654, published by WIPO under International Publication No. WO 99/09499, Feb. 25, 1999.

Ron Schafer, USS Yorktown Smart Ship, 1997, All Hands . . . Online, p. 1–6, http://www.chininfo.navy.mil/navpablib/allhands/ah0997/pg.20.html.*

Web Page entitled "USS Yorktown," Publication Date: Unknown, Printed Date: Sep. 12, 1999.

*Primary Examiner*—Greta Robinson
*Assistant Examiner*—Susan Rayyan
(74) *Attorney, Agent, or Firm*—George T. Marcou; Kilpatrick Stockton LLP (57) ABSTRACT

A method and system for managing transaction card data provides distributed services for use of a transaction card, such as a smart card, on board a ship when shipboard communication with a centralized host system is unavailable. Aspects of the centralized land-based system, such as card issuance, card management, and issuer host authentication are migrated to the shipboard environment, and an on board issuance system, a distributed card management system, and a local monitoring and administration system are introduced to the shipboard environment. When the ship leaves port, an instance of the central system database data for the on board ship personnel is hosted on board the ship and stored in the distributed card management system database. Tracking data representing current transaction information for the transaction cards of the ship personnel is also stored in the distributed card management system database, and at regular intervals, when ship-to-shore communication is available, the land-based and shipboard databases are synchronized with one another.

41 Claims, 7 Drawing Sheets

U.S. PATENT DOCUMENTS

| | | | | |
|---|---|---|---|---|
| 5,995,965 A | * | 11/1999 | Experton | 707/10 |
| 6,014,748 A | * | 1/2000 | Tushie et al. | 257/679 |
| 6,018,717 A | * | 1/2000 | Lee et al. | 705/13 |
| 6,078,928 A | * | 6/2000 | Schnase et al. | 705/26 |
| 6,142,369 A | * | 11/2000 | Jonstromer | 235/379 |
| 6,213,391 B1 | * | 4/2001 | Lewis | 235/380 |
| 6,233,588 B1 | * | 5/2001 | Marchoili et al. | 707/200 |
| 6,233,683 B1 | * | 5/2001 | Chan et al. | 713/172 |
| 6,282,522 B1 | * | 8/2001 | Davis et al. | 235/375 |
| 6,289,324 B1 | * | 9/2001 | Kawan | 235/375 |
| 6,351,813 B1 | * | 2/2002 | Mooney et al. | 380/259 |
| 6,367,011 B1 | * | 4/2002 | Lee et al. | 380/255 |

* cited by examiner

SmartCard Overview  /134
Clearing & Settlement - Flow

METHOD AND SYSTEM FOR MANAGING TRANSACTION CARD DATA

CROSS REFERENCE TO RELATED APPLICATION

This application claims the benefit of applicant's application having U.S. Serial No. 60/122,272 filed Mar. 1, 1999 now abandoned.

FIELD OF THE INVENTION

The present invention relates to transaction cards and in particular to a layered/distributed environment which provides distributed services for use of a transaction card, such as a smart card, on board a ship when shipboard communications with a centralized host system are not available.

BACKGROUND OF THE INVENTION

In many chip card (also known as integrated circuit chip cards or smart cards) environments today, the chip card has specific services and the like that are incorporated onto the card and that interact with a system to perform some service with the system. These are on-line transactions that require a centralized host to perform, for example, authentication or verification services and to perform and complete the actual service transaction.

In a situation such as shipboard use of a chip card, for example, on board a military vessel, shipboard communications may not necessarily be continuous, and there may be times when it is not possible to make a connection between the chip card and various land-based centralized or back-end systems because of an interruption, such as a communications blackout. Therefore, there is a need for a system which provides an environment in which a chip card can operate both on land and on board a ship, even during periods when shipboard communications are not available.

SUMMARY OF THE INVENTION

It is a feature and advantage of the present invention to provide a layered/distributed environment for transaction card services on board ships in periods of isolation and which, as a result, provides continuous service in both shipboard and land-based environments.

To achieve the stated and other features, advantages and objects, an embodiment of the present invention makes use, for example, of computer hardware and software to provide a method and system for managing transaction card data that affords complete services for use of a transaction card, such as a smart card, on board a ship when communication between the ship and a centralized host system is unavailable. An embodiment of the present invention utilizes, for example, a layered approach to migrate aspects of a centralized land-based system, such as card issuance, card management, and issuer host authentication to a shipboard environment.

An embodiment of the present invention introduces, for example, an on board issuance system, a distributed card management system, and a local monitoring and administration system, which replicate certain functionality that is available within the centralized environment to the shipboard environment. The land-based card management system holds a snapshot, for example, of all transaction cards issued within the system, as well as profile information for the transaction cardholders. For example, data representing information about a particular transaction cardholder and the cardholder's transaction card is centrally stored in the central system database.

In an embodiment of the present invention, when the ship leaves port, a snapshot of the central system database, which provides a profile of all personnel on board the ship is hosted on a shipboard based system. An instance of the centrally stored data, for example, for the particular transaction cardholder is taken on board the ship and stored in the distributed card management system database. The cardholder's transaction card is tracked by the on board system and, for example, tracking data representing current transaction information for the cardholder's transaction card is also stored in the distributed card management system.

In an embodiment of the present invention, when shipboard communication is available with the land-based central system from time-to-time, a synchronization process allows for updates to be made both from the shipboard based distributed card management system back to the central system and from the central system to the distributed card management system. Thus, the land-based centrally stored data and the data stored in the shipboard based distributed card management system database are periodically synchronized with one another, so that the most current possible data is available to both systems.

The land-based centrally stored data for an embodiment of the present invention includes, for example, specific information about the transaction cardholder, such as profile information about the cardholder, and general information about one or more transaction card applications and services for the cardholder's transaction card. This data is centrally stored, for example, in connection with initializing and personalizing the cardholder's transaction card by the land-based card issuance system.

The land-based centrally stored data for an embodiment of the present invention also includes, for example, data representing information about one or more transactions, such as a load transaction or a purchase transaction, with the cardholder's transaction card at a card accepting device, such as a point of sale terminal, a telephone device, an automatic teller machine, a telephone-based home loading device, or a commercial load kiosk. The instance of the centrally stored data that is taken on board the ship and stored in the distributed card management system database represents a snapshot of the centrally stored data and includes, for example, a profile of all the individual cardholders on board the ship.

In an embodiment of the present invention, the data that represents on board tracking information, such as current transaction information, that is also stored in the shipboard based distributed card management system database includes, for example, data representing information about one or more shipboard transactions, such as a load transaction or a purchase transaction, with the cardholder's transaction card at a card accepting device, such as a point of sale terminal, a telephone device, an automatic teller machine, a telephone loading automatic teller machine, or a commercial load kiosk.

In an embodiment of the present invention, communication is periodically established between the shipboard distributed card management system database and the land-based central system database to synchronize and update the data stored in the respective databases. This periodic communication can be established over a wireless communication device, such as a satellite communication system, a radio frequency device, or any other suitable wireless device. Alternatively, the periodic communication can be established over a wire line communication device, for example, when the ship is in port, such as a wire or cable communication device.

These and other objects, advantages and novel features of the invention will be set forth in part in the description which follows, and in part will become more apparent to those skilled in the art upon examination of the following or may be learned by practice of the invention.

DETAILED DESCRIPTION

Referring now in detail to an embodiment of the invention, an example of which is illustrated in the accompanying attachments, the present invention provides a method and system for a layered/distributed smart card interface that affords complete services for use of the smart card in delivering traditional on-line services, for example, on board a ship when shipboard communications with a centralized host system are not available. Within the chip card environment, there are a number of entities that are required for successful operation of the system.

One such entity for an embodiment of the present invention is an initial in-process system which allows an authorized individual to create a card that can be given to a staff member or a client for use. This initialization and personalization process is a secured process, and also one that requires both general information about the applications and services on the card and specific information about the individual customer that is going to receive the card.

In an embodiment of the present invention, a second component for operation of the system is a card management system which is utilized to track the history of the card through its life cycle of use. For example, there is information included in the card management system about the card as it is issued, and there is information that is collected about all transactions performed against the card. The card management system may be used to provide honorable histories of transactions, as well as service support.

In an embodiment of the present invention, a third entity for operation of the system is the issuer host system, which is an authentication server that is used to authenticate and validate that the card that is being interacted for a particular service is an authentic card. The card uses information that it receives from the issuer host to authenticate the issuer host as a valid source of information that it can receive to complete the performance of a service.

In an embodiment of the present invention, these systems are typically managed in a centralized fashion and in a land-based environment or an environment in which communication is available, for example, 24 hours a day, 7 days a week. Centralized solutions provide the level of service necessary and provide the level of security necessary to secure the environment.

In an embodiment of the present invention, a layered approach is used to migrate services, for example, to a ship that supports the issuance, the card management, and the issuer host authentication process. The layered approach can also, for example, integrate an account management process for local accounts as sources of funds into a number of entities that can operate independently from the central system. The system addresses, for example, replication of the data, synchronization of the data, and processing of the services for the card holders, while assuring that the system as a whole maintains data integrity.

Figure 1:
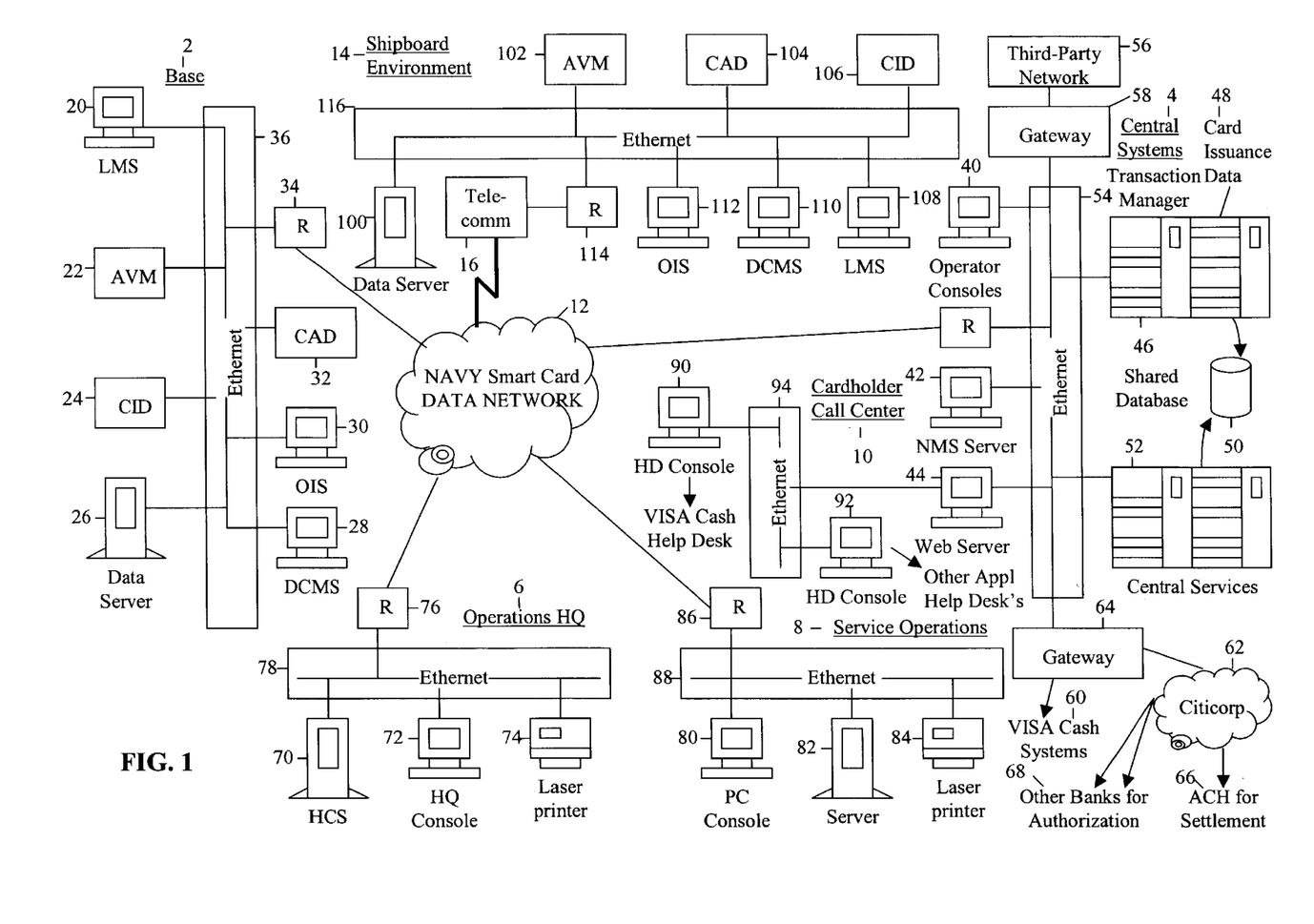
FIG. 1 is a schematic diagram which shows an overview of key components and the flow of information between the key components for an example of the layered/distributed card interface infrastructure for an embodiment of the present invention.

FIG. 1 is a schematic diagram which shows an overview of key components and the flow of information between the key components for an example of the layered/distributed card interface infrastructure for an embodiment of the present invention. Referring to FIG. 1, an embodiment of the present invention includes, for example, a base 2, a central systems 4, an operations headquarters 6, a service operations 8, a cardholder call center 10, all coupled together over a smart card data network 12, and a shipboard environment 14 coupled over a communication device 16 to the smart card data network 12.

Referring further to FIG. 1, the base 2 includes, for example, a local monitoring and administrations system 20, an add value machine 22, a card interface device 24, a data server 26, a distributed card management system 28, an on board issuance system 30, a card accepting device 32, and a router 34, all coupled together over an ethernet 36. The card accepting device 32 includes, for example, one or more each of a merchant point-of-sale (POS) terminal, pay telephone, automatic teller machine (ATM), telephone-based home loading device, and/or a commercial load kiosk. The card interface device 24 includes, for example, one or more card reader devices.

The central systems 4 for an embodiment of the present invention includes, for example, operator consoles 40, a network management server 42, a web server 44, a transaction manager 46, card issuance data 48, a shared database 50, and central services 52, all coupled together over an ethernet 54. A third party network 56 is coupled over a gateway 58 to the central systems ethernet 54, and a card system 60 and a financial institution network 62 are coupled over a gateway 64 to the central systems ethernet 54. Further, an automated clearing house system for settlement 66 and other banks for authorization 68 are coupled over the financial institution network 62.

Referring again to FIG. 1, the operations headquarters 6 includes, for example, a headquarters computer system 70, a headquarters console 72, a laser printer 74, and a router 76, coupled to one another over an ethernet 78. The service operations 8 includes, for example, a personal computer console 80, a server 82, a laser printer 84, and a router 86, coupled to one another over an ethernet 88. The cardholder call center 10 includes, for example, a card system help desk console 90 and an applications help desk console 92 coupled over an ethernet 94 and, in turn, coupled over web server 44 to the central systems ethernet 54.

Referring once more to FIG. 1, the shipboard environment 14 includes, for example, a data server 100, an add value machine 102, a card accepting device 104, a card interface device 106, a local monitoring and administration system 108, a distributed card management system 110, an on board issuance system 112, and a router 114, all coupled together over an ethernet 116. The router 114 is likewise coupled to the communication device 16. The card accepting device 104 includes, for example, one or more each of a merchant POS terminal, a pay telephone, an ATM, a PATM, and or a commercial load kiosk. The card interface device 106 includes, for example, one or more balance reader devices.

The layered/distributed smart card interface system for an embodiment of the present invention introduces three components to the on board ship environment 14. The three components are identified, for example, as the on board issuance system 112, the distributed card management system 110, and the local monitoring and administration system 108. These components replicate certain functionality on board the ship that would be available within a centralized environment, such as central system 4. These components are also replicated at the base because, for example, a base may also have periods of time during which communications are disrupted or limited.

The functionality of the on board issuance system 112 includes, for example, peripherals and security modules for processing cards, card applications repository, and linkage to the distributed card management system 108 for profile and recent status. The functionality of the on board issuance system 112 also includes, for example, data allocations to individualize and diversify products on cards, session management and load authentication, and access security.

In an embodiment of the present invention, the on board issuance system 112 is the most secure unit of the three. It is managed in a secure environment, and the staff that has access to it is limited to a relatively few number of individuals. The on board issuance system 112 supports the process of monitoring and managing the security modules that are local to the shipboard environment. It also has security modules that are required to initialize and personalize the cards. The on board issuance system 112 also includes, for example, a card application repository, so that based on the services that are required for an individual card when it is issued, the appropriate applications are loaded onto the card.

In an embodiment of the present invention, the on board issuance system 112 also has, for example, a linkage to the distributed card management system 110 which holds the local instance of a cardholder's profile and any recent status, so that if a cardholder on board ship loses his or her card and needs to obtain a new card through reissuance, a relatively accurate status of the lost card is available. This on board issuance system 112 is also the entity that supports, for example, the session management for any authentication required for any application locally on board the ship.

In an embodiment of the present invention, another component introduced to the on board ship environment 14 is the distributed card management system 110. Functionality of the distributed card management system 110 includes, for example, authorized cardholder database, such as profile, starting and local history, and debit and/or credit line, dispute resolution support, replication and/or synchronization processing, and linkage to the on board issuance system 112. The centralized card management system 4 holds a snapshot of all cards issued within the system, and also holds the profile information for the owners of those individual cards. When a ship leaves port, a snapshot of that database, which provides a profile of all the personnel that are on board the ship, is taken on board the ship.

In an embodiment of the present invention, when shipboard communications are available with the land-based central system 4, there is a synchronization process that allows for updates to be made both from the distributed card management system 110 back to the central system 4 and from the central system 4 back to the individual distributed card management system 110. This synchronization keeps the databases synchronized, so that the most current possible data is available, if either a card needs to be reissued or if there is a local inquiry which relates to dispute resolutions that must be dealt with in the on board ship environment 14.

In an embodiment of the present invention, the distributed card management system 110 both interfaces on regular intervals to the central system 4 to maintain the integrity of the data, and is also used through a local communication link 116 with the on board issuance system 112 to support both reissuance of cards and any sort of authentication processing that is necessary. The distributed card management system 110 may be the repository of any transaction data associated with an individual card that requires resolution on board the ship.

In an embodiment of the present invention, a further entity that is introduced in the on board ship environment 14 is the local monitoring and administration system 108. The functionality of the local monitoring and administration system 108 includes, for example, device monitoring and/or management, asset management, and purse collection point processing and batch file validation. In addition, functionality of the local monitoring and administration system includes, for example, replication and/or archival services, and communications with the central system 4.

The local monitoring and administration system 108 for an embodiment of the present invention includes a number of devices, such as servers and input devices. The local monitoring and administration system 108 includes, for example, terminals, such as point of sale terminals, load devices, and various other kinds of devices that are used to interact with the chip card to provide services associated with one of the applications. The local monitoring and administration system 108 manages and monitors those assets or devices on board ship and provides information about any failure, so that service personnel can go and repair the equipment. The local monitoring and administration system 108 is set up to support those sets of functions.

In an embodiment of the present invention, the local monitoring and administration system 108 also performs, for example, collection processing for all points of sale and for load batches that must be uploaded. The local monitoring and administration system 108, for example, holds load batches and distributes them to the distributed card management system 110 locally. Also, during those periods of time when communication is available with the central system 4, the local monitoring and administration system 108 provides upload of the load batches to the central system 4 for processing. Clearing and settlement at this point in time for any financial application associated with the card is done by the central system 4 after these load batches are uploaded. Clearing and settlement can also be handled locally using the collected transaction data. This permits maintenance of local accounts with actual settlement being managed through normal channels.

In an embodiment of the present invention, the local monitoring and administration system 108 also supports all of the replication and archival services for the entities in the on board ship environment 14. Since there are a number of databases that are distributed, for example, throughout the servers, such replication and archival services allow data to be taken off as it is received to provide backup. Therefore, the local monitoring and administration system 108 supports rebuilding the databases, in the event of a catastrophic failure on one of the units.

In another aspect of an embodiment of the present invention, when personnel are transferred or visiting a ship, it may be necessary to acquire information so that such personnel can utilize the chip card in that environment. If the ship is operating in a restricted communications mode or for other reasons may not be able to communicate, information for an individual must be collected in a different manner. There are two instances which are included in the embodiment of the present invention. First is the instance of a current cardholder coming on board the ship. The official responsible for checking in has a workstation at his or her site which is capable of reading the card and which is connected to the internal data communications record. Upon check-in, the new arrival inserts his or her card into the reader which collects all necessary configuration and status information and distributes to the shipboard systems which manage this operation.

If the new arrival does not hold a current card, he or she is escorted to the local issuance office, for an embodiment of the present invention, at which time a determination is made as to whether the individual needs only a 'visitor's card' or if a personalized card need be issued to that individual. A visitor's card is an anonymous card which gives the holder minimal privileges. If a higher level of service or access is required for the new arrival, then he or she must apply for a card, and the local card issuance staff collects the data, prepares the card, and delivers it to the individual. In either case, the data collected is synchronized with the central system as needed the next time communication is permitted with the central systems.

Figure 2:
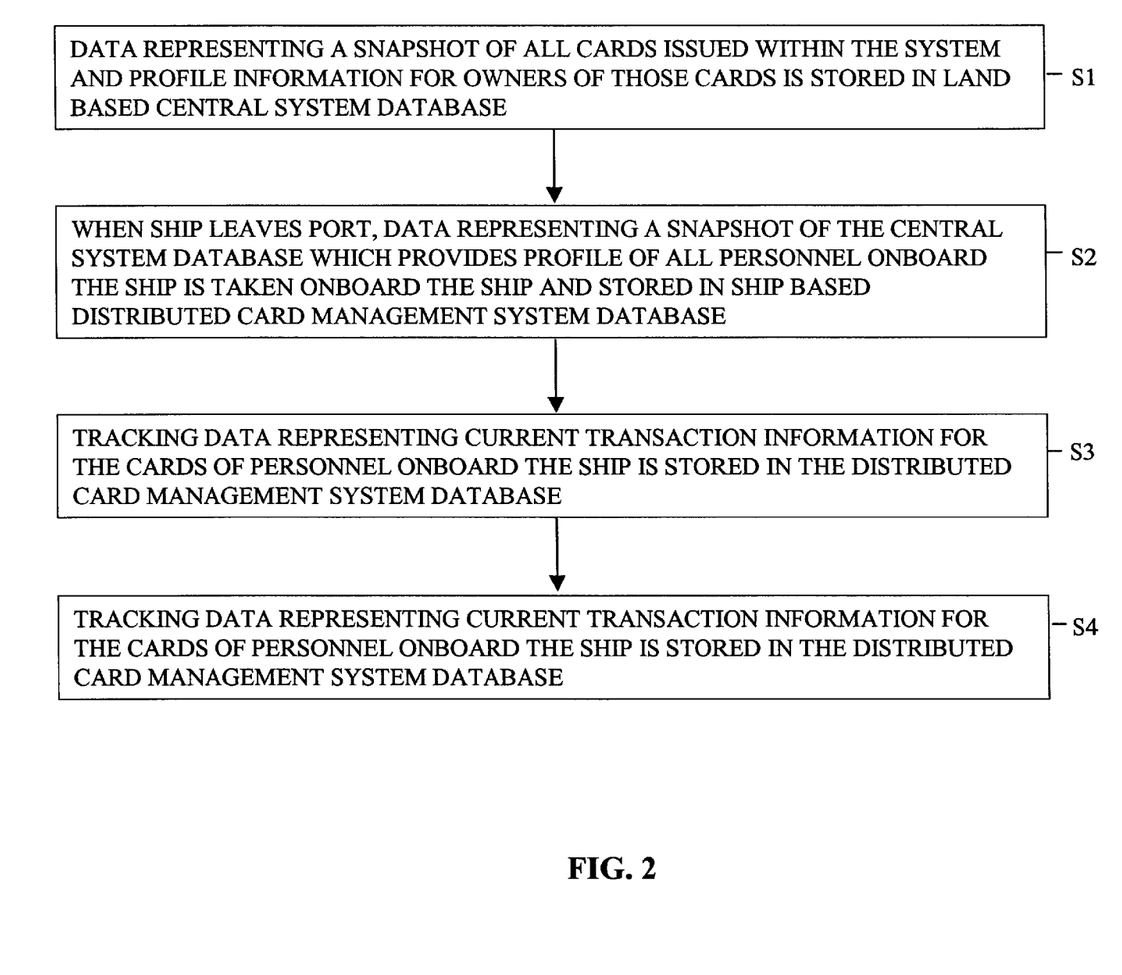
FIG. 2 is a flow chart which illustrates an example of the process of managing transaction data in an on board environment for an embodiment of the present invention.

FIG. 2 is a flow chart which illustrates an example of the process of managing transaction card data in the on board ship environment 14 for an embodiment of the present invention. Referring to FIG. 2, at S1, data representing a snapshot of all cards issued within the system, as well as profile information for owners of those cards, is stored in a database of the land-based central system 4. At S2, when the ship leaves port, data representing a snapshot of the database of the central system 4, which provides a profile of all the personnel on board the ship, is taken on board the ship and stored in a database of the ship based distributed card management system 110.

Referring further to FIG. 2, at S3, tracking data representing current transaction information for the cards of personnel on board the ship is also stored in the database of the distributed card management system 110. At S4, at regular intervals of time when ship-to-shore communication is available, for example, by wireless or cable communication device, the ship based distributed card management system 110 interfaces to the land-based central system 4 to update and synchronize the data stored in the respective databases of the distributed card management system 110 and the central system 4 with one another.

Figure 3:
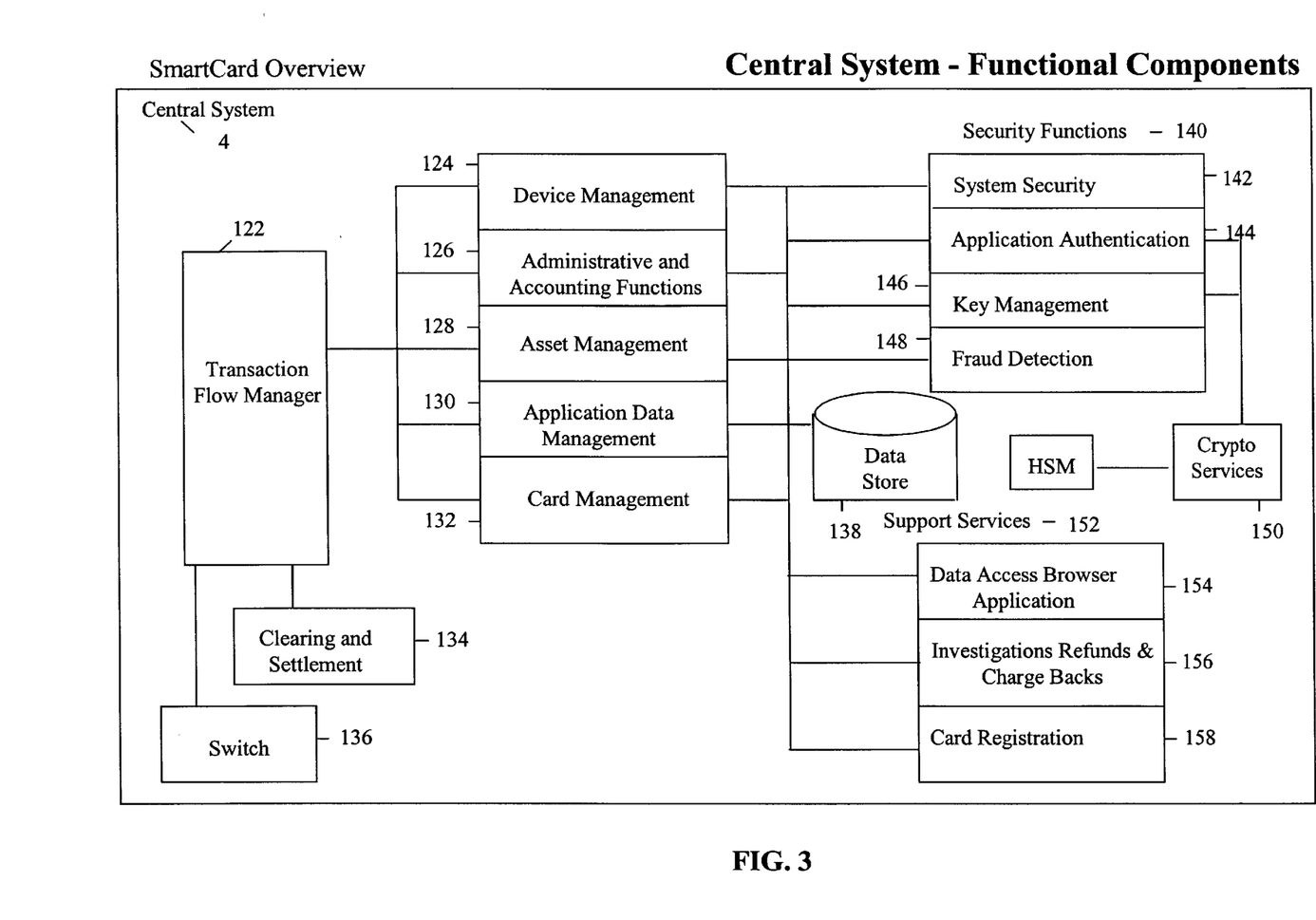
FIG. 3 is a schematic diagram which illustrates examples of the functional components of the central system for an embodiment of the present invention.

FIG. 3 is a schematic diagram which illustrates examples of the functional components of the central system 4 for an embodiment of the present invention. Referring to FIG. 3, functional components of the central system 4 include, for example, a transaction flow manager 122, device management 124, administrative and accounting functions 126, asset management 128, application data management (card, device and system) 130, card management 132, clearing and settlement 134, switch 136, and data store 138.

In an embodiment of the present invention, functions of the transaction flow manager 122 include, for example, on-line session management, batch file distribution control, and internal system routing. Functions of device management 124 include, for example, key revision control, "hot list" distribution, software configuration, and status monitoring. Administrative and accounting functions 126 include, for example, computer center operations and control, such as log-on, billing, and backups and cutovers. Asset management 128 includes, for example, device inventory and systems inventory. Application data management 130 includes, for example, application stores (version control), application data updates, and rules management.

The card management system 132 for an embodiment of the present invention provides, for example, support for the card life cycle, management of chip specific features, and management of application specific data. The card management system 132 also provides, for example, an interface to the fraud detection and prevention system and "hot listing" processing, the marketplace, and distributed environments. Other aspects of the card management system 132 include, for example, card and application issuance, such as cryptographic functions, chip and plastic personalization, applet downloading, and issuance logging. Additional aspects of card management system functionality include, for example, card inventory management, card activation monitoring, card administration and key management, and card utilization tracking.

Figure 4:
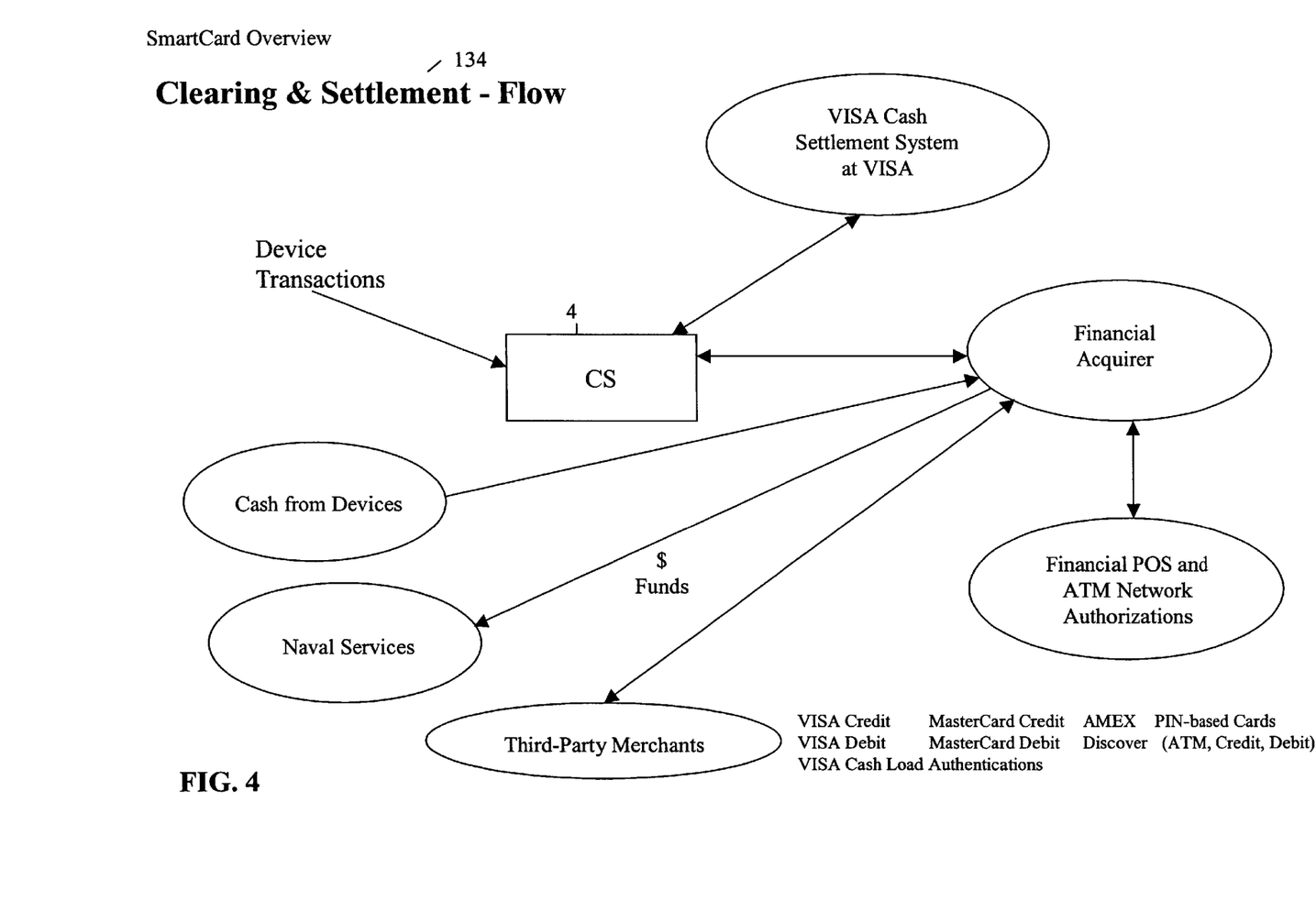
FIG. 4 is a schematic diagram which illustrates an overview of an example of key components and the flow of information between the key components in the clearing and settlement process for an embodiment of the present invention.

Functionality of clearing and settlement 134 for an embodiment of the present invention includes, for example, communications to the central system 4, central system processing, load acquiring, merchant acquiring, financial network gateways, and funds movement. FIG. 4 is a schematic diagram which illustrates an overview of an example of key components and the flow of information in clearing and settlement 134 for an embodiment of the present invention.

Referring again to FIG. 3 for an embodiment of the present invention, functionality of switch 136 includes, for example transaction routing, gateway services, and settlement funds distribution, and functions of data store include, for example, data collection, such as transaction, device, and inventory data, data inquiry, and data archiving.

Referring further to FIG. 3, functional components of the central system 4 for an embodiment of the present invention also include security functions 140, such as system security 142, application authentication 144, key management 146, fraud detection 148, and cryptographic services 150. In addition, functional components of the central system 4 include support services 152, such as data access (customer service, operations and maintenance) 154, investigations and report generation 156, and card registration 158.

Purchase transactions through the central system 4 are processed, for example, in batch mode. In other words, there are files that hold purchase transactions that are uploaded and then processed through for settlement. In an embodiment of this invention, purchase transactions may be held longer at the local site but are eventually synchronized at the central host. In the load environment on-line, every transaction is processed individually and sent to a settlement system. In an embodiment of the present invention, loads are batched up to be passed off, and there is a modification to the processing of load transactions on the back-end systems to support batch processing of loads.

In an embodiment of the present invention, on-line communications from the ship to the various back-end or central systems 4 can be, for example, by satellite communication from shipboard or non-satellite, such as a suitable radio frequency or any other suitable type of communication via communication device 16. Additionally, the system for an embodiment of the present invention can support multiple modes of communication, depending on the location of the ship and the available communication at the particular location in the world. For example, when the ship is in port, communications via communication device 16 can be by wire or cable tied in to the base network 2.

In an embodiment of the present invention, the card is, for example, an integrated circuit chip card which functions like a typical automated teller machine (ATM) card, in which data can be loaded on the chip of the card, rather than a magnetic stripe card. Therefore, the paradigm on board ship is, for example, a base-type environment or more traditional ATM type of environment. Essentially, a cardholder can use the base account or, for example, any other account as a funding source to withdraw cash.

In an embodiment of the present invention, when the cardholder uses, for example, the base account or any other account as a funding source to withdraw cash and loads it on the chip card for the cash function within the chip card, the cardholder simply loads value onto the card at the ATM instead of, for example, receiving an actual bill for the value. So, an embodiment of the present invention follows the typical ATM paradigm. In an embodiment of the present invention, the card combines a magnetic stripe and chip and uses those technologies jointly to complete the funding of the purse described above.

In an embodiment of the present invention, on board ship personnel can have what is referred to as a shadow account for the personnel that are attached to the ship, in which a portion of their pay is allocated to that account and which can be used by shipboard personnel while on duty. Shadow account information can, for example, can be integrated into the chip card for use in the system. Alternatively, on board ship personnel can be provided with another equivalent of an ATM card for use in the system.

In an embodiment of the present invention, if the on board personnel already have ATM cards, such cards can be used in conjunction with the chip cards, for example, to identify the funding source, and value can be loaded on to the chip cards instead of delivering actual cash to the cardholders. That is the typical ATM scenario. However, in the scenario in which the account data is integrated onto the chip card itself, the chip card is the only card that interacts with the load device. In other words, the chip card has both the account information, which is the source of funds, as well as an electronic purse in which the funds reside for use on board ship.

In an embodiment of the present invention, an open architecture is used for the electronic purse. An institution, such as the U.S. Navy, can also have its personnel use the chip card on its bases with its own merchants and with merchants that have licenses to operate on its bases. The institution can also have its personnel use the same chip card in communities outside its bases, as merchants outside the bases come to realize that the particular payment mechanism exists.

In an embodiment of the present invention, with enhancements to programs, such as VISA CASH, the same chip card can be used for currency exchange. Thus, the same chip card can be used, for example, whenever a ship goes into any port anywhere in the world, and it is not necessary to bring local currency on board ship to perform currency exchange manually. Rather, the chip card can be used in foreign currency exchange to convert U.S. dollars to local currency, and the chip card can then be used, for example, in merchant transactions locally.

Figure 5:
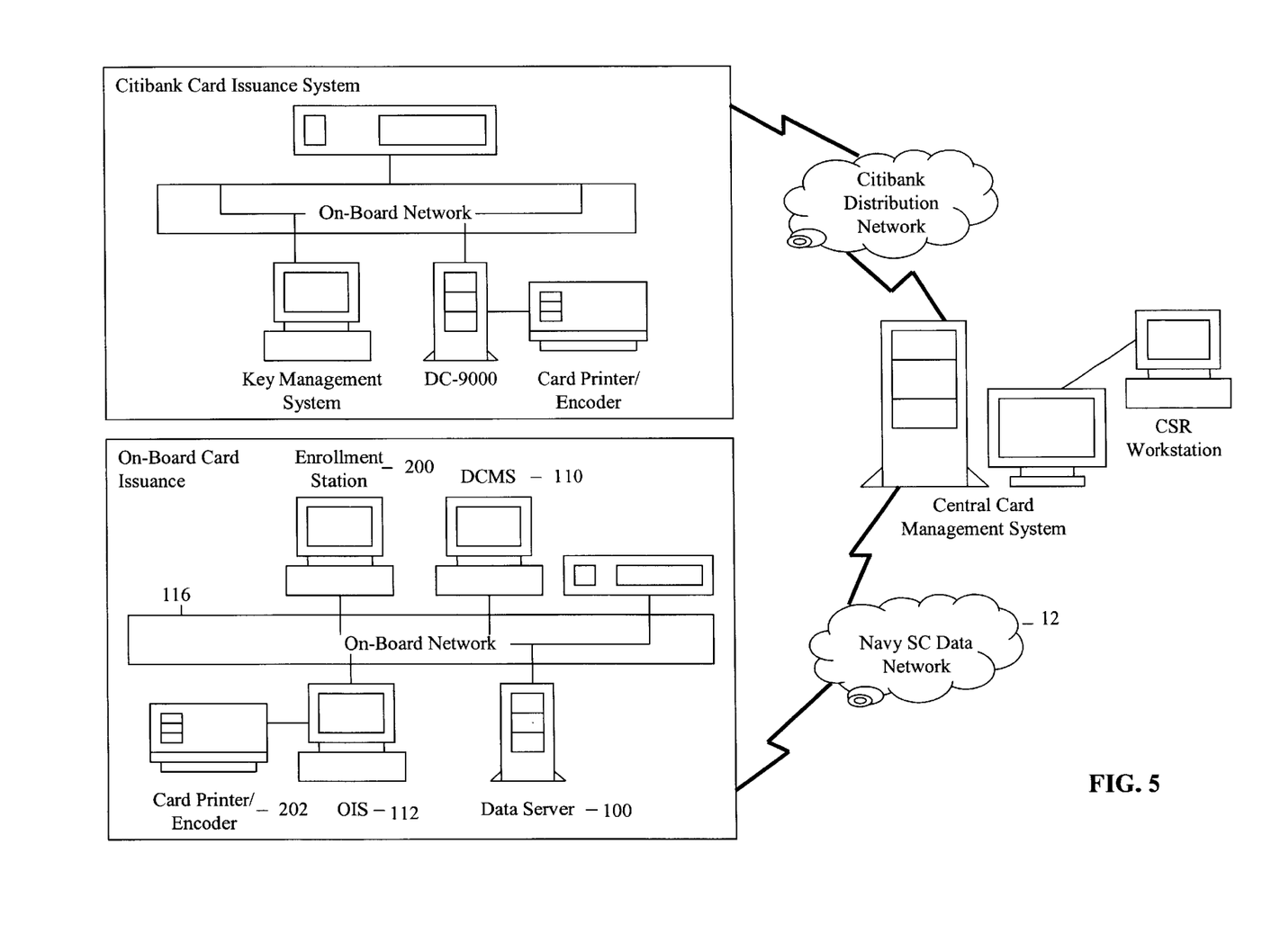
FIG. 5 is a schematic diagram which illustrates examples of key components and the flow of information between key components of the on board card issuance system for an embodiment of the present invention.

In an embodiment of the present invention, hardware components, such as a personal computer (PC) or servers host the software and functionality of the three components which are introduced in the on board ship environment 14. FIG. 5 is a schematic diagram which illustrates examples of key components and the flow of information between key components of the on board card issuance system 112 for an embodiment of the present invention.

Figure 6:
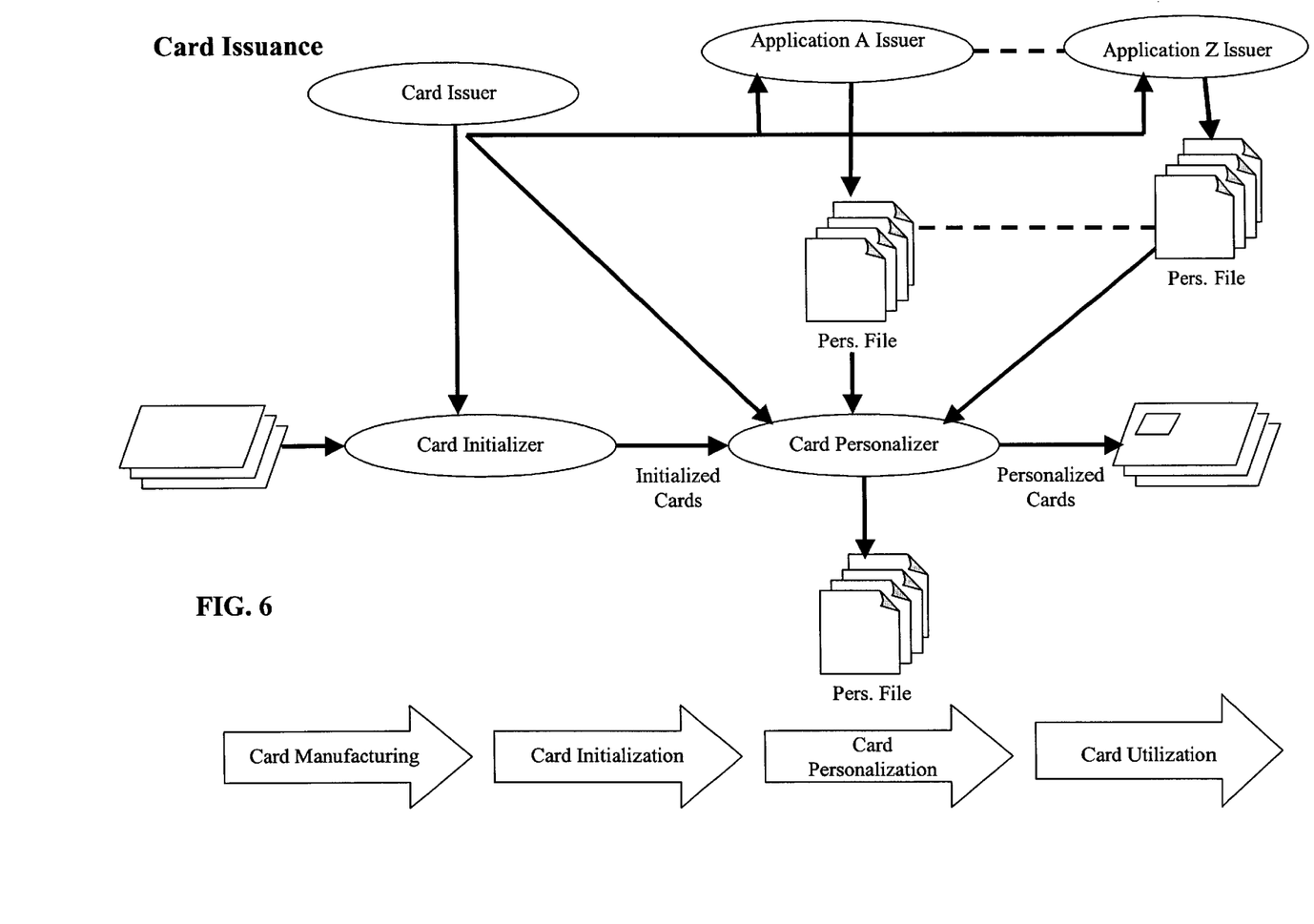
FIG. 6 is a schematic diagram which illustrates an example of key components and the flow of information between the key components for the card issuing process for an embodiment of the present invention.

Functionality of the on board card issuance system for an embodiment of the present invention includes, for example, printing cardholder information to plastic cards, downloading applications to chip modules, loading cardholder information to applications, and establishing security keys and digital certificates. FIG. 6 is a schematic diagram which illustrates an example of key components and the flow of information between the key components of the card issuance process for an embodiment of the present invention.

Referring further to FIG. 5, for the on board issuance system 112 of an embodiment of the present invention, in addition to the basic PC that is incorporated into the system, security modules which hold keys are also incorporated in the system. Further, devices 200 that write to the card, for example, the data necessary to initialize and personalize the card are also incorporated in the system. Also, if desired, a printer 202 to print on the card can be incorporated in the system. All of these are peripheral devices which are integrated with the PC.

In an embodiment of the present invention, additional security is incorporated in the on board issuance system 112 to limit access, and the system has the level of functionality of a batch load terminal. A type of security which is integrated in the on board issuance system 112 prevents the software from operating without a specific CD ROM inserted into the CD ROM drive of the PC, and a chip card is used to permit access to the unit as an addition to password protection. Thus, because of the sensitive nature of the device, there are several layers of security.

In an embodiment of the present invention, the on board issuance system 112 is an independent device, the size of which depends, for example, upon the size of the ship. The size of the ship can range from a relatively small ship with, for example, 100 or so personnel, up to an aircraft carrier. The PC or mini system is sized according to capacity. In other words, the size of the systems are dependent upon the number of personnel on board the individual ship and range from a small PC to a mini system.

In an embodiment of the present invention, while the on board issuance system 112 is an independent system, because of security requirements, for the distributed card management system 110 and the local monitoring and administration system 108, if desired, software can be combined onto a single platform in a small ship environment or logically distributed into the two systems in a larger ship environment.

For the central systems 4, the modifications for an embodiment of the present invention are software changes and additional communications links. Those platforms range from small mini computers to large mainframes, depending on the volume of cards with which those platforms have to deal. For, example, if it is necessary to deal with millions of cards, the card management and authentication systems require very large processing capacity.

In an embodiment of the present invention, the on board issuance system 112, the distributed card management system 110, and the local monitoring and administration system 108 communicate over a local area network 116 on board the ship. As previously indicated, the latter two systems are hosted on devices ranging from a PC to a mini computer, based on the sizing requirements for the units. In addition to the software for the user interface, all three systems have database packages, because all the systems have a variety of data that they have to maintain.

In an embodiment of the present invention, the on board issuance system 112 has encryption hardware, but also has encryption software that is required to interoperate with the security module. The local monitoring and administration system 108 also has, in addition to the standard PC peripherals, a large scale archival device, such as a removable disk or tape media or other archival device. The archival device enables backup of the data sets and pulling the data sets off of other units so that they can archive directly to the same device.

Figure 7:
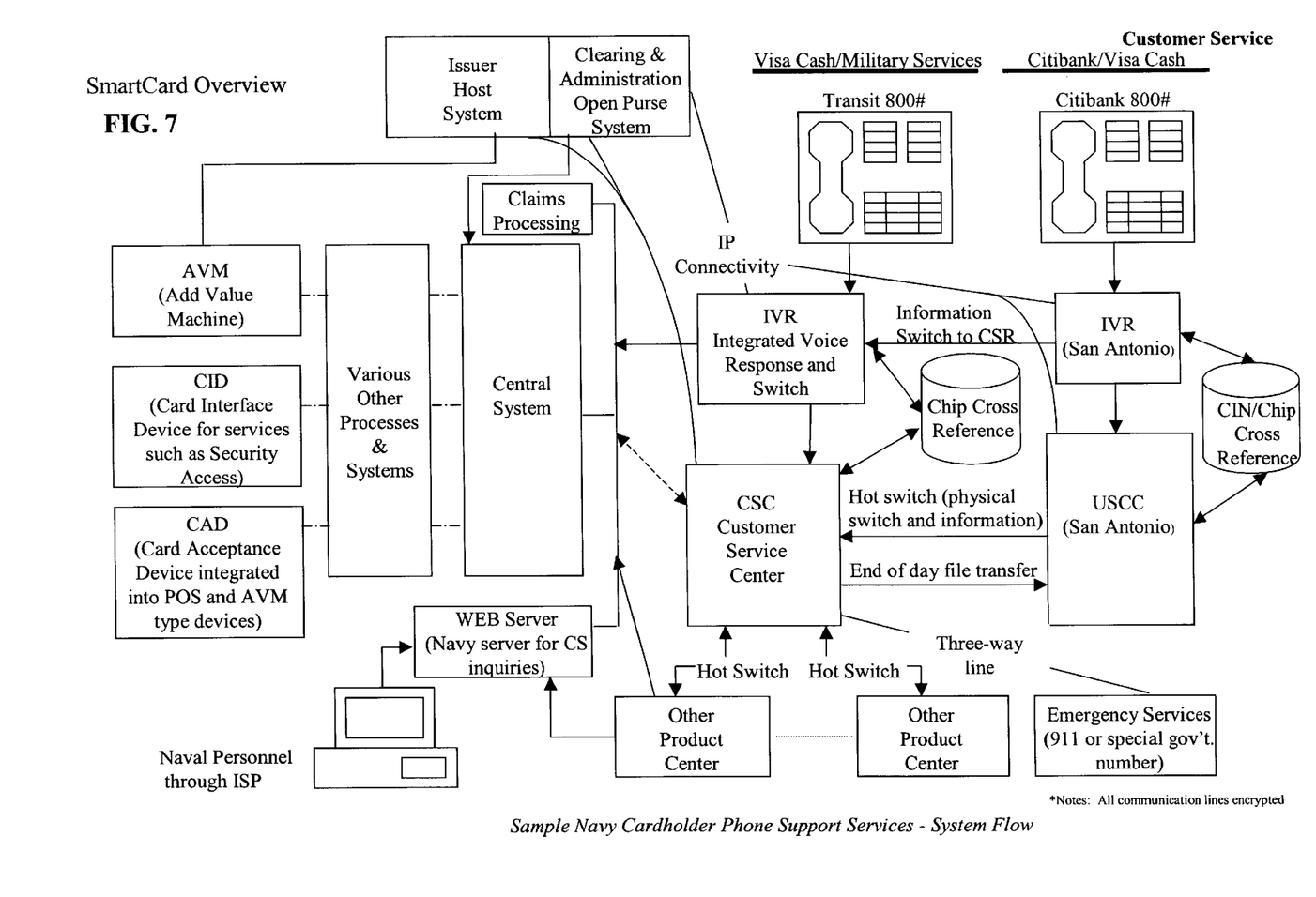
FIG. 7 is a schematic diagram which illustrates an example of key components and the flow of information between the key components for customer service for an embodiment of the present invention.

An embodiment of the present invention also includes customer service. FIG. 7 is a schematic diagram which illustrates an example of key components and the flow of information between the key components for customer service for an embodiment of the present invention.

Various preferred embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention. Accordingly, the invention is only limited by the following claims.

What is claimed is:

1. A method of managing transaction card data, comprising:
   centrally storing data representing information about a transaction cardholder and the cardholder's transaction card in a central system database;
   storing an instance of the centrally stored data in a distributed card management system database disposed at a predetermined location and capable of being transported together with the transaction cardholder away from the predetermined location;
   storing data representing current transaction information for the cardholder's transaction card in the distributed card management system database after transportation of the distributed card management system database together with the transaction cardholder away from the predetermined location; and
   periodically synchronizing the centrally stored data with the data stored in the distributed card management system database.

2. The method of claim 1, wherein centrally storing the data further comprises centrally storing data representing specific information about the transaction cardholder and general information about at least one transaction card application and at least one transaction card service for the cardholder's transaction card.

3. The method of claim 2, wherein centrally storing the data further comprises initializing and personalizing the transaction card for the cardholder according to the specific and general information.

4. The method of claim 1, wherein centrally storing the data representing information about the transaction cardholder further comprises centrally storing data representing profile information about the cardholder.

5. The method of claim 1, wherein centrally storing the data representing information about the cardholder's transaction card further comprises centrally storing data representing information about at least one transaction with the cardholder's transaction card.

6. The method of claim 5, wherein centrally storing the data representing information about the transaction further comprises centrally storing the data representing information about a transaction at a transaction card accepting device.

7. The method of claim 6, wherein the transaction card accepting device further comprises a device selected from a group of transaction card accepting devices consisting of a point of sale terminal, a telephone, an automatic teller machine, a telephone-based home loading device, and a commercial load kiosk.

8. The method of claim 6, wherein centrally storing the data representing the information about the transaction at the transaction card accepting device further comprises centrally storing data representing information about one of a load transaction and a purchase transaction.

9. The method of claim 1, wherein storing the instance of the centrally stored data further comprises storing the instance of the data in the distributed card management system database representing a profile of all individuals on board a ship.

10. The method of claim 1, wherein storing the data corresponding to the centrally stored data further comprises storing data in the distributed card management system database representing a snapshot of the centrally stored data.

11. The method of claim 10, wherein storing the instance of the centrally stored data representing the snapshot of the centrally stored data further comprises storing the instance of the data in the distributed card management system database on board a ship.

12. The method of claim 1, wherein storing the instance of the centrally stored data further comprises storing the instance of the data in the distributed card management system database on board a ship.

13. The method of claim 1, wherein storing data representing current transaction information in the distributed card management system database further comprises storing data representing information for at least one transaction with the cardholder's transaction card.

14. The method of claim 13, wherein storing the data representing the information about the transaction further comprises storing the data representing information about a transaction at a transaction card accepting device.

15. The method of claim 14, wherein the transaction card accepting device further comprises a device selected from a group of transaction card accepting devices consisting of a point of sale terminal, a telephone, an automatic teller machine, a telephone-based home loading device, and a commercial load kiosk.

16. The method of claim 14, wherein storing the data representing the information about the transaction further comprises storing data representing information about one of a load transaction and a purchase transaction.

17. The method of claim 1, wherein storing the data representing current transaction information further comprises storing the data in the distributed card management system database on board a ship.

18. The method of claim 1, wherein periodically synchronizing further comprises periodically updating the data stored in one of the central system database and the distributed card management system database with the data stored in the other of one of the central system database and the distributed card management system database.

19. The method of claim 18, wherein periodically synchronizing further comprises periodically updating the data stored in the central system database with the data stored in the distributed card management system database.

20. The method of claim 19, wherein periodically synchronizing further comprises periodically updating the data stored in the central system database with the data representing current transaction information stored in the distributed card management system database.

21. The method of claim 1, wherein periodically synchronizing further comprises periodically synchronizing the centrally stored data with the data stored in the distributed card management system database on board a ship.

22. The method of claim 21, wherein periodically synchronizing further comprises periodically establishing communication between the central system database and the distributed card management system database.

23. The method of claim 22, wherein periodically establishing communication further comprises periodically establishing communication between the central system database and the distributed card management system database via a wireless communication device.

24. The method of claim 22, wherein periodically establishing communication further comprises periodically establishing communication between the central system database and the distributed card management system database via a cable communication device.

25. A system for managing transaction card data, comprising:
  means for centrally storing data representing information about a transaction cardholder and the cardholder's transaction card;
  means for separately storing an instance of the centrally stored data disposed at a predetermined location and capable of being transported away from the first location and for storing data representing current transaction information for the cardholder's transaction card after transportation of the means for separately storing an instance of the centrally stored data away from the predetermined location; and
  means for periodically synchronizing the centrally stored data with the separately stored data.

26. The system of claim 25, wherein the means for centrally storing the data further comprises a central system database.

27. The system of claim 26, wherein the means for centrally storing the data further comprises a land-based central system database.

28. The system of claim 26, wherein the means for centrally storing the data further comprises a card issuance system coupled to the central system database.

29. The system of claim 28, wherein the card issuance system coupled to the central system database further comprises a land-based card issuance system coupled to a land-based central system database.

30. The system of claim 25, wherein the means for separately storing the instance of the centrally stored data further comprises a distributed card management system database.

31. The system of claim 30, wherein the means for separately storing the data representing current transaction information further comprises the distributed card management system database.

32. The system of claim 31, wherein the distributed card management system database further comprises a shipboard based distributed card management system database.

33. The system of claim 25, wherein the means for periodically synchronizing the centrally stored data with the separately stored data further comprises means for periodically establishing communication between the means for storing the centrally stored data and the means for storing the separately stored data.

34. The system of claim 33, wherein the means for storing the centrally stored data further comprises a land-based central system database.

35. The system of claim 33, wherein the means for storing the separately stored data further comprises a shipboard based distributed card management system database.

36. The system of claim 33, wherein the means for periodically establishing communication further comprises a wireless communication device.

37. The system of claim 33, wherein the means for periodically establishing communication further comprises a cable communication device.

38. A system for managing transaction card data, comprising:
  a land-based central system having a database for centrally storing data representing transaction card information;
  a shipboard based system having a database disposed at a predetermined location and capable of being transported away from the predetermined location for separately storing an instance of at least a portion of the centrally stored data and for storing data representing current transaction card information after transportation of the shipboard based system database away from the predetermined location;
  a communication device periodically coupling the land-based central system database to the shipboard based system for updating the centrally stored data with the separately stored data.

39. The system of claim 38, wherein the shipboard based system further comprises an on board card issuance system, a distributed card management system, and a local monitoring and administration system coupled to one another over a network.

40. The system of claim 39, wherein the communication device further comprises one of a wireless communication device and a cable communication device.

41. A method of managing transaction card data, comprising:
  centrally storing data representing information about a plurality of transaction cardholders and the cardholders' transaction cards in a central system database;
  storing an instance of the centrally stored data in a distributed card management system database disposed at a predetermined location and capable of being transported together with the plurality of transaction cardholders away from the predetermined location;
  allowing the distributed card management system database to be transported together with the plurality of transaction cardholders away from the predetermined location;
  storing data representing current transaction information for at least some of the plurality of transaction cardholders' transaction cards in the distributed card management system database after transportation of the distributed card management system database together with the plurality of transaction cardholders away from the predetermined location; and periodically synchronizing the centrally stored data with the data stored in the distributed card management system database.

* * * * *